(12) United States Patent
Ikeda (10) Patent No.: US 7,815,018 B2
(45) Date of Patent: Oct. 19, 2010

(54) MECHANICAL BRAKE ACTUATOR

(75) Inventor: Takashi Ikeda, Oura-gun (JP)

(73) Assignee: Nisshinbo Holdings, Inc., Tokyo (JP)

( * ) Notice: Subject to any disclaimer, the term of this patent is extended or adjusted under 35 U.S.C. 154(b) by 952 days.

(21) Appl. No.: 11/622,081

(22) Filed: Jan. 11, 2007

(65) Prior Publication Data
US 2007/0158149 A1 Jul. 12, 2007

(30) Foreign Application Priority Data
Jan. 11, 2006 (JP) ............................. 2006-004021

(51) Int. Cl.
*F16D 65/14* (2006.01)
(52) U.S. Cl. .................. 188/2 D; 188/106 A; 74/502.6
(58) Field of Classification Search ................ 188/2 D, 188/106 A, 106 F, 106 P, 74, 78, 79.57, 325, 188/331; 74/502.6, 500.5, 502.4
See application file for complete search history.

(56) References Cited

U.S. PATENT DOCUMENTS 6,817,450 B2 * 11/2004 Tatsumi et al. .............. 188/2 D
7,434,668 B2 * 10/2008 Fujiyama .................... 188/2 D
7,575,104 B2 * 8/2009 Ikeda et al. ................ 188/2 D

FOREIGN PATENT DOCUMENTS

JP 2001-349360 12/2001
JP 2004-108458 8/2004

* cited by examiner

*Primary Examiner*—Pam Rodriguez
(74) *Attorney, Agent, or Firm*—Apex Juris, pllc; Tracy M Heims (57) ABSTRACT

A mechanical brake actuator realizing the miniaturization of the entire device and the reduction of the parts costs is provided. When the brake lever rotates in the cable releasing direction, the connecting pin can be connected with the free end of the brake lever from one facing plate side while the other facing plate restricts the movement of the connecting pin, and the clip (30) is set on one facing plate (23*b*) so as to restrict the movement of the connecting pin after connecting the brake cable and the brake lever via the connecting pin.

6 Claims, 11 Drawing Sheets

MECHANICAL BRAKE ACTUATOR

BACKGROUND OF THE INVENTION

1. Field of the Invention

The present invention relates to a mechanical brake actuator providing an avoidance means to prevent a brake cable from disconnecting from a brake lever.

2. Description of the Related Art

This type of brake actuator has a mechanical actuating mechanism, which is comprised of a plate-like brake lever, a strut pivotally retained in the brake lever, and a pivotal pin, wherein the mechanical actuating mechanism is positioned between a pair of brake shoes, and the brake lever and the strut relatively rotates as operating, i.e., pulling and releasing a brake cable connected to the brake lever, also spreading the brake lever and the strut apart from each other.

Then, after a connecting pin that is penetrating through a cable connecting hole of the brake cable and a connecting hole of the brake lever, which is exposed from an opening of the strut as aligning both holes in series, thereby connecting the brake cable and the brake lever, an almost C-shape clip fits over an exterior of the strut, and recesses, which are formed on both internal side surfaces of the clip, engage with protrusions, which are formed on both external surfaces of the strut, for the clip to position the brake lever in a space between the facing plates of the strut. (See the paragraphs 0015-0016 and FIGS. 2-4 of the reference patent 1)

Furthermore, instead of the above-described structure, there exists an integral type where the clip is rotatably set on the strut. (See the paragraphs 0020-0023 and FIGS. 5-8 of the reference patent 1)

Also, for another means to position the brake lever in the space of the strut, a spring steel plate is bent to form a resilient member, which is to be set on the strut or the brake lever, where a resilient piece, formed on a part of the resilient member, is positioned along a rotational track of the brake lever, so as to restrict the rotation of the brake lever. (See the paragraphs 0018-0039 and FIGS. 2-12 of the reference patent 2)

The reference Patent 1 is the Japanese Provisional Patent Publication No. 2001-349360 (pages 4 and 5, FIGS. 2-8). The reference patent 2 is Japanese Provisional Patent Publication No. 2004-108458 (pages 5 and 9, FIGS. 2-12).

The invention disclosed in the reference patent 1 has the following problems.
(1) The clip needs to be wide so as to fit over the exterior of the strut; therefore, the material cost of the clip increases. Forming processes for fitting means on both clip and strut is necessary to prevent the clip from disengaging from the strut; therefore, the manufacturing cost is increased.
(2) If the clip is integrated with the strut, to provide rotational axis on both external surfaces of the facing plates is necessary, which increases the manufacturing cost.
(3) Both sides of the facing plates of the strut have notched grooves, which degrade the stiffness of the strut. Also, for a brake device which needs to lower the height, as the bridge portion of the strut is lowered, the notched groove becomes deeper, which degrades the stiffness of the strut.

The invention disclosed in the reference patent 2 has the following problems. (1) If the resilient member is inserted and set in a wide space of the strut, the space between the facing plates of the strut becomes larger. Therefore, this configuration gives a non-preferable layout, and it is difficult to apply in a small size brake device. If a brake device with a flexible layout choice is usable, which degrades the stiffness of the strut, the strut deforms easily. (2) If the resilient member is set on the bridge portion of the strut, the bridge portion needs to be smaller. Therefore, the facing plates, a constant space therebeween being maintained by the bridge portion, are more susceptible to an external force, thereby increasing the possibility of bending to open the same. (3) If the resilient member is set on the brake lever, which degrades the stiffness of the bridge portion.

The present invention was made in consideration of the above problems, and an object of the invention is to provide a mechanical brake actuator realizing the miniaturization of the entire device and the reduction of the parts costs. Furthermore, another object of the invention is to provide a mechanical brake actuator remarkably improving the clip setting operation.

SUMMARY OF THE INVENTION

In order to accomplish the above-described objects, the mechanical brake actuator of the present invention comprises (a) a strut to engage with one brake shoe, the strut including first and second facing plate and a bridge portion connecting the facing plates; and (b) a plate-like brake lever to engage with the other brake shoe and to be retained in a space between the facing plates of the strut, the brake lever including a proximal end pivotally supported at the strut. The brake lever and the strut relatively rotate to spread apart from each other as pulling a brake cable connected to a free end of the brake lever via a connecting pin, wherein the first facing plate is designed so as to permit a longitudinal movement of the connecting pin to connect the brake cable and the free end of the brake lever, while the brake lever is rotating in a cable releasing direction to a limit, and the second facing plate is designed so as to restrict the movement of the connecting pin while the brake lever rotates in the cable releasing direction to the limit, and a clip is set on the first facing plate so as to restrict the longitudinal movement of the connecting pin which connects the brake cable and the brake lever. The invention prevents the brake cable from disengaging by the simple operation of fitting the small clip on first facing plate of the strut.

Furthermore, the invention is such that in the above-described mechanical brake actuator, the notched groove is formed on the first facing plate to permit the longitudinal movement of the connecting pin therethrough while the brake lever rotates in the cable releasing direction to the limit. Still further, the invention is such that in the above-described mechanical brake actuator, the means to restrict a lateral movement of the clip is provided on the first facing plate. Still further, the invention is such that in the above-described mechanical brake actuator, the clip is temporarily set on the first facing plate. Still further, the invention is such that in the above-described mechanical brake actuator, the clip is slidably set on the first facing plate so as not to separate each other. Still further, the invention is such that in the above-described mechanical brake actuator, the clip is slidably set on the first facing plate. Yet further, the invention is such that in the above-described mechanical brake actuator, the clip is rotatably set on the first facing plate.

The present invention has the following advantages. (1) Simply setting the clip on one of two facing plates of the strut improves the setting operation of the clip. (2) To provide notched grooves at both facing plates of the strut is not necessary, thereby limiting the degradation of the entire stiffness of the strut. Furthermore, the invention prevents the degradation of the stiffness of the bridge portion compared with the situation where the clip is set on the bridge portion of the strut. (3) The clip is set on one of the two facing plates of the strut, which downsizes the clip and can be manufactured by a simple bending process, thereby decreasing the material cost and the manufacturing cost of the clip. (4) A combination of the strut and the clip, which is set on one of the facing plates, can restrict the free movement of the connecting pin, which has no effect of the height of the bridge portion to be formed on the strut. Accordingly, the height of the bridge portion can be lower, which can satisfy the strong demand of lowering the height of the brake device.

BRIEF DESCRIPTION OF THE DRAWINGS

The above and other objects of the present invention will become readily apparent by reference to the following detailed description when considered in conjunction with the accompanying drawings wherein.

PREFERRED EMBODIMENTS OF THE INVENTION

In the following sections, a mechanical brake actuator relating to the invention will be explained.

EXAMPLE 1

Figure 1:
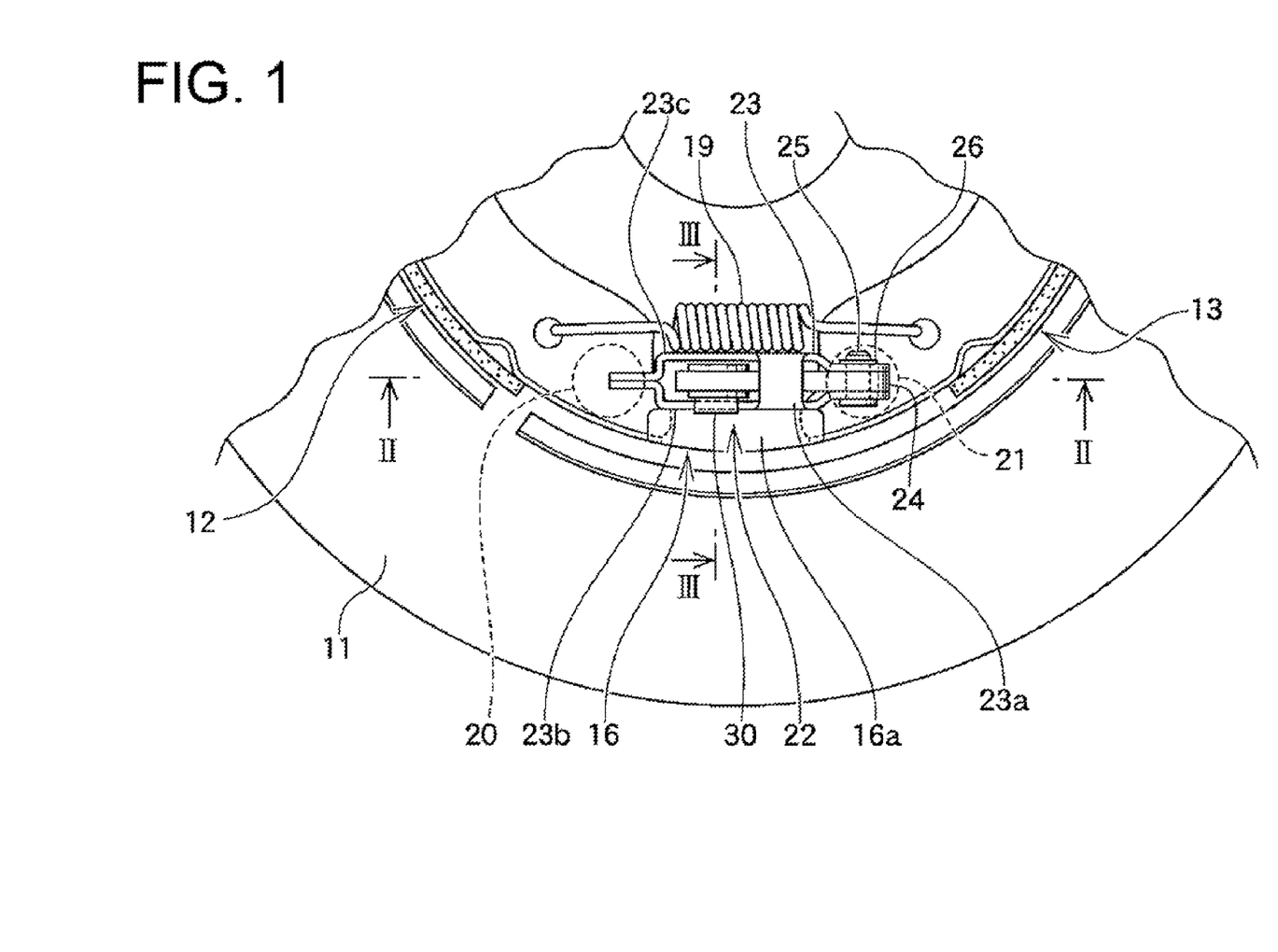
FIG. 1 is a plan view of an example of the drum brake with the mechanical brake actuator according to the first example.
Figure 2:
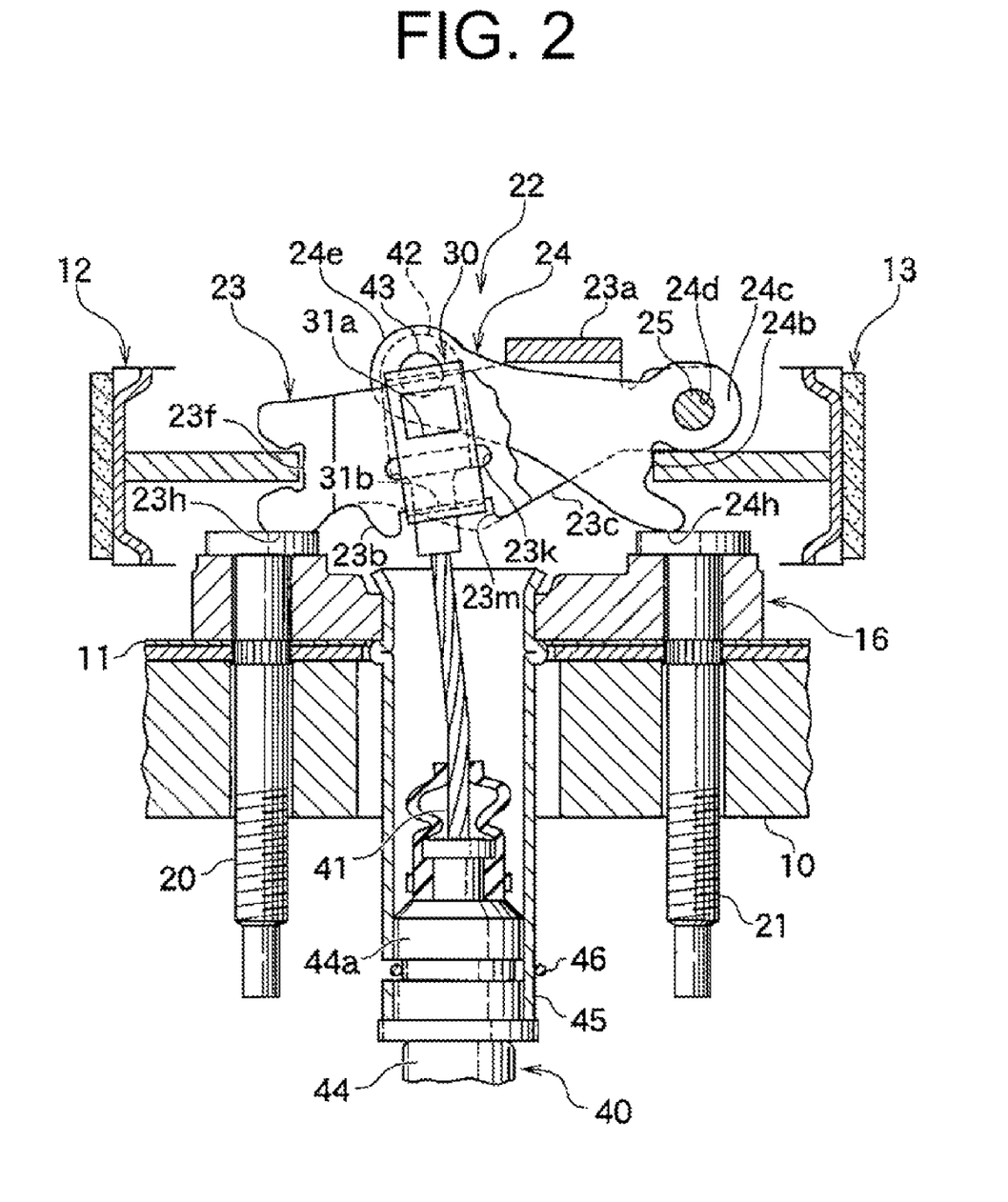
FIG. 2 is a cross section view of FIG. 1 taken along the line II-II.
Figure 3:
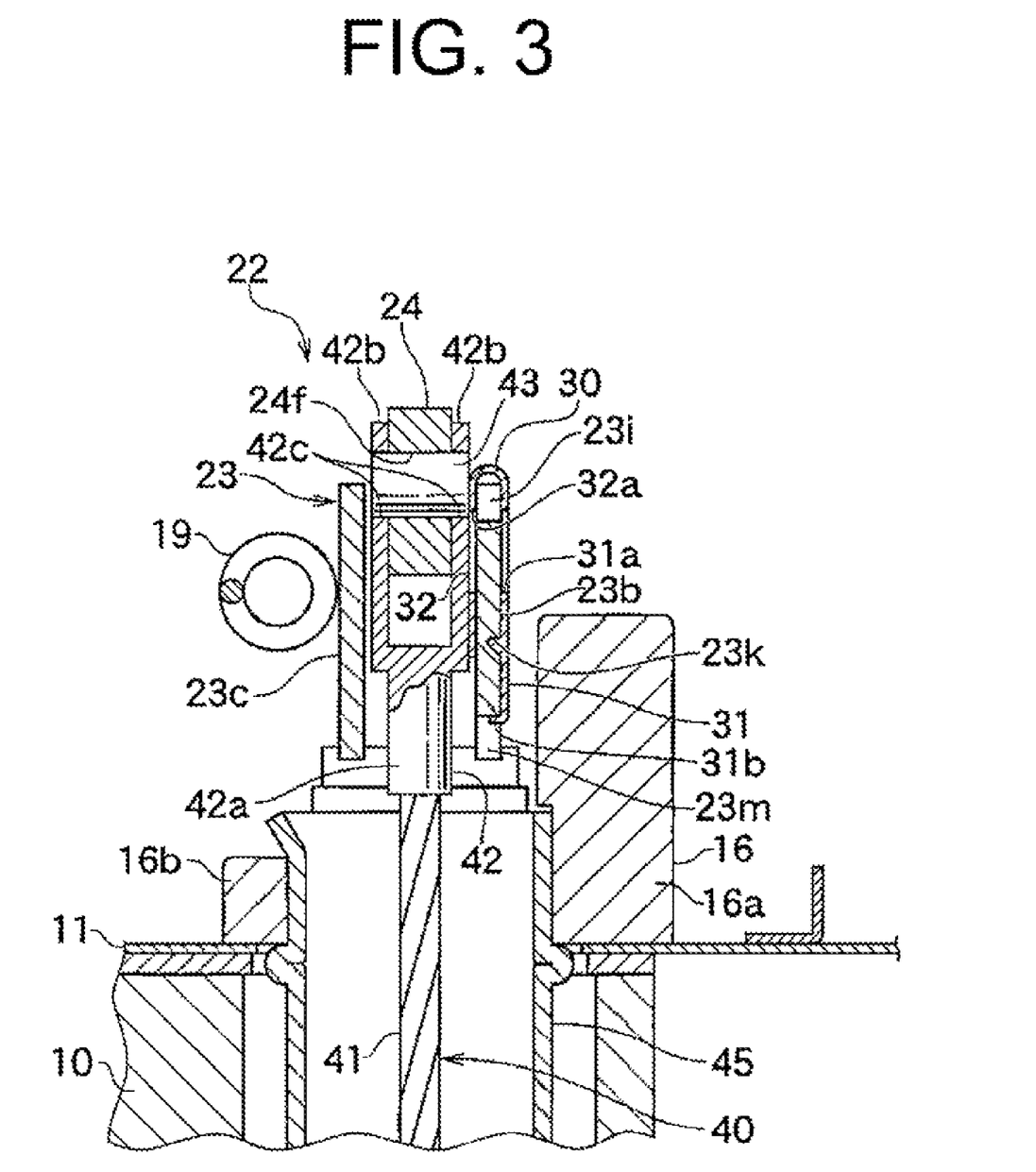
FIG. 3 is a cross section view of FIG. 1 taken along the line III-III.
Figure 4:
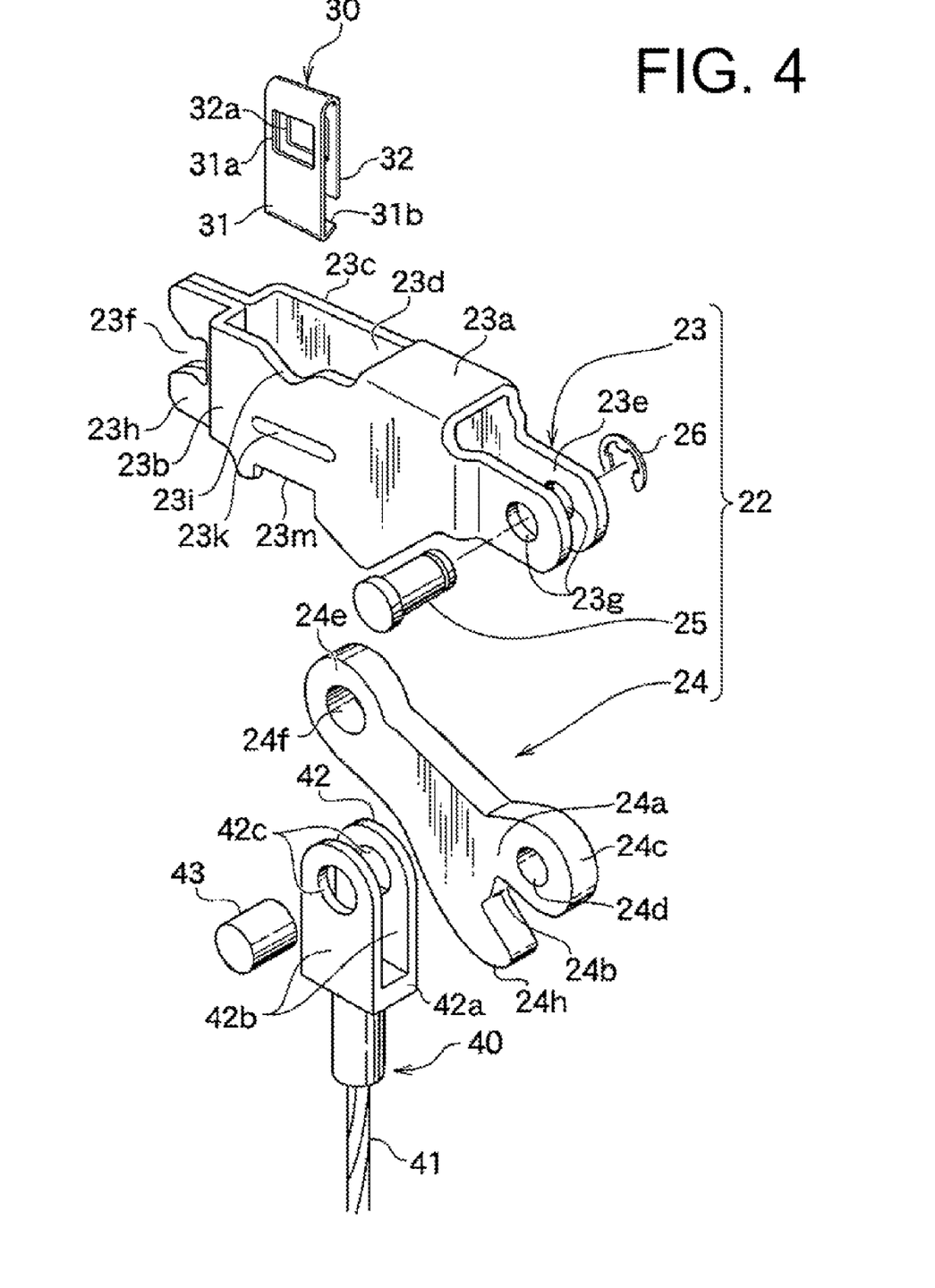
FIG. 4 is an exploded perspective view of the mechanical brake actuator according to the first example.

FIG. 1 is a plan view of an example of the drum brake device with the mechanical brake actuator, FIGS. 2 and 3 are cross-section views of FIG. 1, and FIG. 4 is an exploded perspective view of the mechanical actuating mechanism. The first example of the invention will be explained with reference to the drawings.

A pair of brake shoes 12,13 are movably mounted, via a shoe hold mechanism (not shown in the figures), on a back plate 11 which is fixed on a stationary portion 10 of a vehicle, and a pair of facing one ends of the brake shoes 12, 13 are supported by raised portions 16a, 16a of a later described anchor 16 while the other ends also facing each other, not shown in the figures, are linked via a linking part. A pair of shoe return springs (where only one shoe return spring 19 of the two shoe return springs appears in the figures), extended between both brake shoes 12, 13, maintains a condition of abutment between both ends of both brake shoes 12,13 and linking part and between both ends and the anchor 16.

A mechanical actuating mechanism 22 which expands one ends of both brake shoes 12,13 is comprised of a strut 23, a brake lever 24, a pivot pin 25, and a washer 26, which is positioned adjacent to the raised portion 16a of the anchor 16 between both brake shoes 12,13.

The strut 23, which is a component of the mechanical actuating mechanism 22 and is made of one plate, has a bridge portion 23a at an intermediate portion between both longitudinal ends of the strut 23 and facing plates 23b, 23c which are formed to bend the plate in C-shape. Furthermore, one ends of the facing plates 23b, 23c, which are facing each other, are superposed to attach together such as by welding, and a wide space (clearance) 23d is reserved between both ends in the longitudinal direction, while a narrower space (clearance) 23e which is narrower than the space 23d, is continuously formed at the other ends thereof. The superposing portion at one side of the facing plates 23b, 23c has a shoe engagement groove 23f while the other side has pivotal holes 23g, 23g formed therein. The bridge portion 23a, bridging over and connecting the upper portions of the facing plates 23b, 23c, shuts one section of the wide space 23d, and at the same time restricts a clockwise rotation of the brake lever 24, as shown in FIG. 2.

Also, the clip 30 is set on one facing plate 23b to restrict the movement of the connecting pin 43.

The notched groove 23i, permitting the connecting pin 43 to pass therethrough, is provided around an upper end of one facing plate 23b where the clip 30 is set thereon; a positioning recess 23k, which fixes a temporal setting position of the clip 30, is provided around an intermediate portion of the external side surface thereof; and a disengagement preventing groove 23m, to prevent the clip 30 from moving laterally, is provided around a lower portion of the external side surface. The positioning recess 23k and the disengagement preventing groove 23m function to position and secure the clip 30.

The other facing plate 23c, while an upper end surface of the brake lever 24 abutting against the bridge portion 23a of the strut 23, when the connecting pin 43 is inserted in the later described connecting holes 42c, 24f of the brake cable 40 and the brake lever 24, abuts against an end of the connecting pin 43. The bridge portion 23a, the brake lever 24, and both facing plates 23b, 23c, while the brake lever 24 abutting against the bridge portion 23a, interact each other so that one facing plate 23b permits the connecting pin 43 to pass therethrough while the other facing plate 23c prevents the connecting pin 43 from passing therethrough.

The brake lever 24, one of the components of the mechanical actuating mechanism 22, is made of one plate, which is positioned and retained in the spaces 23d, 23e of the strut 23. A shoe engagement groove 24b is formed at a proximal portion 24a of the brake lever 24, wherein a pivot hole 24d, though which a pivot pin 25 is penetrated, is formed in a projection 24c at one end thereof having a shoe engagement groove 24b, a washer 26 is clipped on an end of the pivot pin 25 as penetrating through pivot holes 23g, 24d, 23g of the strut 23 and the brake lever 24, thereby pivotally supporting the brake lever 24 relative to the strut 23. The clockwise rotation of the brake lever 24 in FIG. 2 is restricted as an upper end surface thereof abutting against the bridge portion 23a of the strut 23.

A brake cable connecting hole 24f is formed at a free end 24e of the brake lever 24. And then a cable end 42 fixed to the end of the inner cable 41, which constitute a later described brake cable 40, can be connected via a connecting pin 43.

Also, the strut 23 and the brake lever 24, which constitute the mechanical actuating mechanism 22, have projections 23h, 24h at a cable operational direction side, which are slidably landed on the heads of installation bolts 20, 21 as shown in FIG. 2.

The brake cable 40 is comprised of an inner cable 41 and an outer casing 44. The clevis-shaped cable end 42 is fixed on the end of the inner cable 41, and a pair of forked legs 42b, 42b are extending from a proximal end 42a of the cable end 42. The legs 42b, 42b have connecting holes 42c, 42c, which are directly facing each other for the connecting pin 43 to penetrate therethrough.

The clip 30, used to prevent the connecting pin 43 from disengaging, is slidably clipped on one facing plate 23b of the strut 23.

Figure 6:
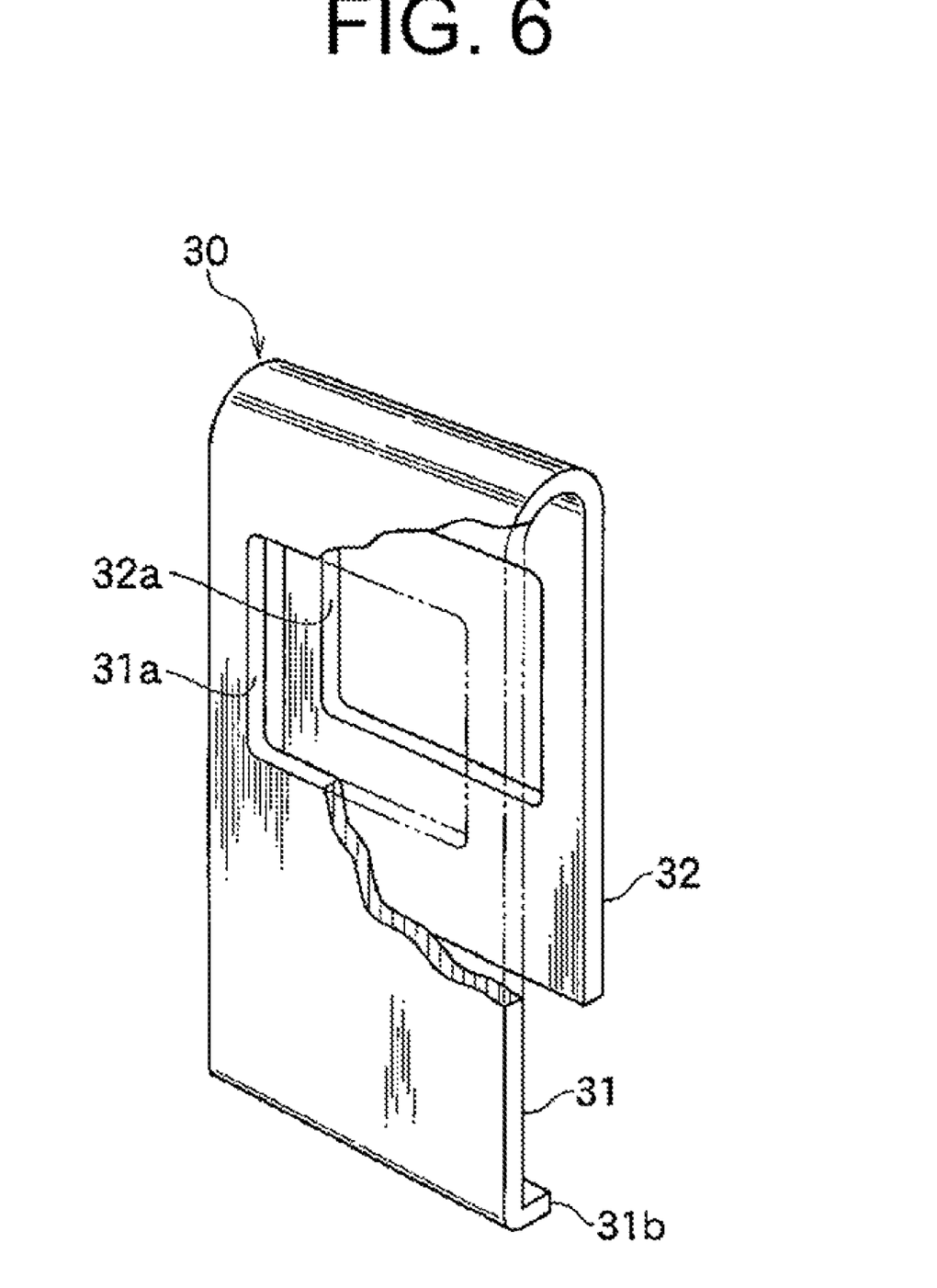
FIG. 6 is a perspective view of a partially omitted clip according to the first example.

As shown in FIG. 6, the clip 30 of this example is formed by bending one thin spring steel plate into a U or C shape, resulting in one pair of facing clipping pieces 31, 32 to be resiliently clipped on one facing plate 23b of the strut 23. One clipping piece 31 of the pair of facing clipping pieces 31, 32, which abuts against the external side surface of one facing plate 23b, around its intermediate portion, has a by-pass hole 31a of a sufficient size permitting the connecting pin 43 to pass through, and around its end, is bent toward the other facing plate 23c to form a hook 31b, which can be hooked in a positioning recess 23k and on the displacement preventing groove 23m. The width of the hook 31b is slightly shorter than the width of the displacement preventing groove 23m to prevent the hook 31b from moving laterally within the displacement preventing groove 23m.

The other clipping piece 32, which abuts against an internal side surface of one facing plate 23b, around its intermediate portion, has a by-pass hole 32a with sufficient size to permit the connecting pin 43 to pass through. Both by-pass holes 31a, 32a are arranged to face each other, and when the hook 31b of one clipping piece 31 being hooked in the positioning recess 23k of the strut 23, the connecting pin 43 can pass therethrough while when the clip 30 is pushed to slide to temporarily set the hook 31b in the displacement preventing groove 23m of the strut 23, the connecting pin 43 abuts against the clip 30 to restrict the displacement of the connecting pin 43. In this example, both by-pass holes 31a and 32a are square holes; however the holes can be round or other shapes.

Because of this structure, the cable end 42 does not physically disconnect from the brake lever 24 during the transportation of the drum brake device.

The clip 30 engages with the positioning recess 23k of the strut 23 and the displacement preventing groove 23m individually so as to position the clip 30 at a different position relative to one facing plate 23b.

That is, the upper end surface of the brake lever 24 in this example abuts against the bridge portion 23a of the strut 23, and the clip 30 clipped on one facing plate 23b of the strut 23 slides vertically to change the positions of both by-pass holes 31a, 32a relative to one facing plate 23b, while restricting the brake lever 24 to rotate in the cable releasing direction, thereby permitting the connecting pin 43 to pass therethrough and restricting the movement of the connecting pin 43 thereafter. In other words, when the brake lever 24 abuts against the bridge portion 23a of the strut 23, the by-pass holes 31a, 32a of the clip 30 temporary setting on the strut 23 are aligned in the same center line as the notched groove 23i formed on one facing plate 23b of the strut 23 and the connecting holes 42c, 24f formed on the free end 24e of the brake lever 24, thereby establishing interrelation for inserting and setting the connecting pin 43.

Figure 7:
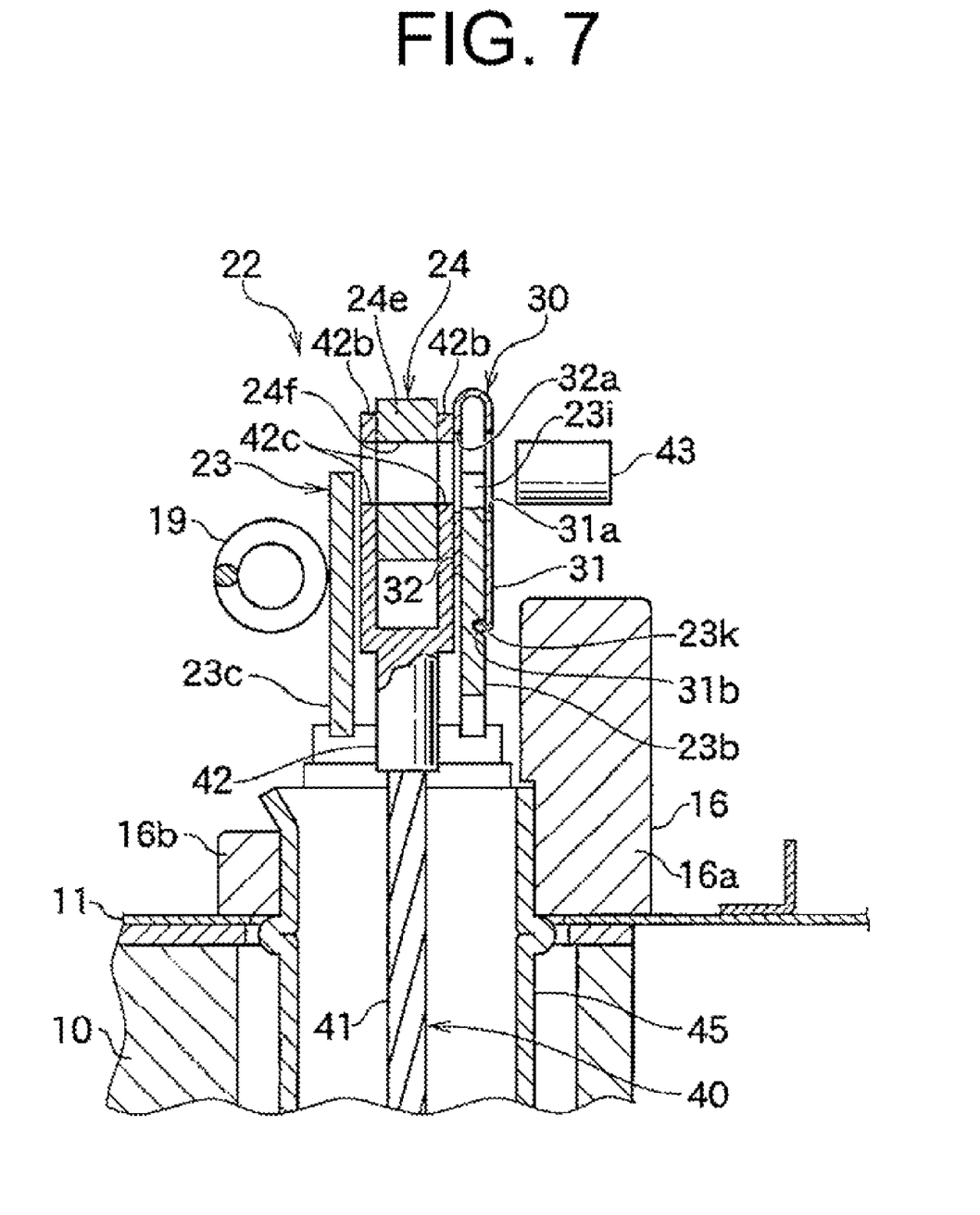
FIG. 7 is a cross section view of the mechanical brake actuator prior to the insertion of the connecting pin.
Figure 8:
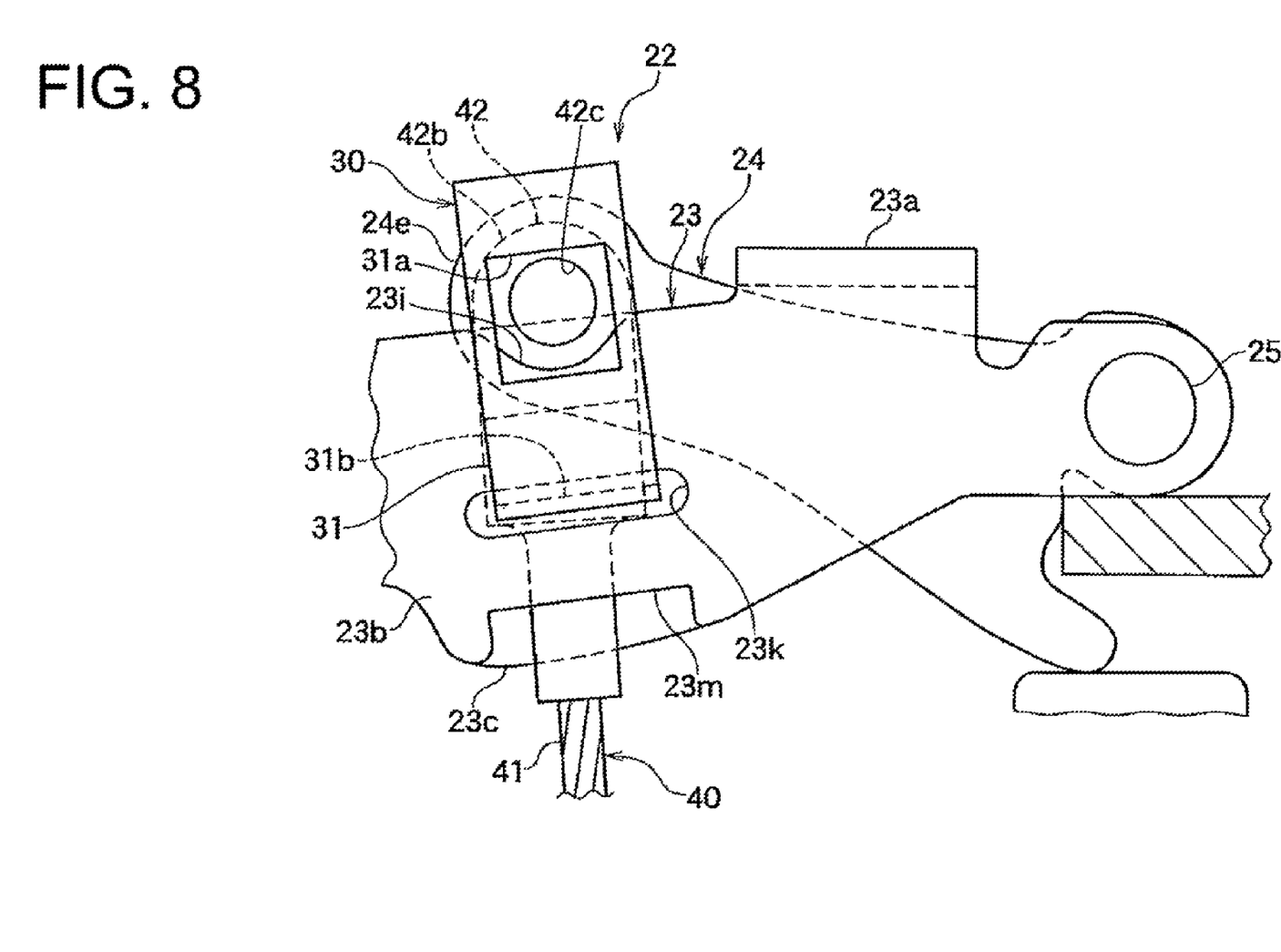
FIG. 8 is an enlarged view of the mechanical brake actuator structure and operation prior to the insertion of the connecting pin, which illustrates the condition where the free end of the brake lever is exposed from the opening of the space of the strut in the cable releasing direction side.

A connecting process for the brake cable will be explained next. FIGS. 7 and 8 show a condition of the mechanical actuator mechanism 22 prior to connecting the brake cable 40 to the brake lever 24.

In order to temporarily set the clip 30 on the strut 23, an opening of the clip 30 pushed against the notched groove 23i formed on one facing plate 23b of the strut 23 so as to open the pair of facing clipping pieces 31, 32, and the hook 31b at the end of one clipping piece 31 is pushed until it reaches to the positioning recess 23k of the strut 23. By the simple process described above, the resilient force of one clipping piece 31 positions the hook 31b into the positioning recess 23k. When the hook 31b of the clip 30 is temporarily set on the strut 23, both by-pass holes 31a, 32a of the clip 30 are superposed and almost aligned with the notched groove 23i formed on one facing plate 23b of the strut 23 for the connecting pin 43 to pass therethrough. Positioning of the clip 30 is accomplished not only by the engagement point of the hook 31b and the positioning recess 23k, but also by elastically clipping one facing plate 23b on the pair of clipping pieces 31, 32, thereby providing stable positioning and eliminating the possibility of dropping during the transportation of the drum brake.

The inner cable 41 is pinched by fingers to be inserted in to a guide pipe 45, and the cable end 42, fixed at the end of the inner cable 41, passes through the wide space 23d of the strut 23 to reach the free end 24e of the brake lever 24, and the free end 24e is retained between a pair of legs 42b and 42b. When the inner cable 41 is pushed until the brake lever 24 abuts against the bridge portion 23a of the strut 23, the free end 24e projects from the wide space 23d of the strut 23 in the cable releasing direction. The connecting hole 42c is designed such that one portion of the connecting hole 24f at the other facing plate 23c of the strut 23 is shut and that the connecting hole 42c at one facing plate 23b is entirely exposed from the notched groove 23i. (See FIGS. 7 and 8) As confirming both by-pass holes 31a, 32a of the clip 30 temporarily setting on the strut 23, the notched groove 23i, and the connecting holes 42c, 24f, 42c are almost aligned, the connecting pin 43 is inserted from outside at one facing plate 23b of the clip 30. The connecting pin 43 is pushed until the end thereof abuts against the facing plate 23c, and the connection between the brake lever 24 and the cable end 42 are completed.

When the cable end 42 is connected to the brake lever 24, as shown in FIG. 8, as an upper end of the clip 30 is pushed in the cable operating direction, the engagement between the hook 31b of the clip 30 and the positioning recess 23k of the strut 23 is released.

When the clip 30 is further pushed, the hook 31b engages with the displacement preventing groove 23m formed on one facing plate 23b. The hook 31b is positioned as abutting against the side surface of the displacement preventing groove 23m, which effectively prevents the clip 30 not only from displacing laterally but also moving in the opposite direction of pushing the clip 30 as hooking on a bottom surface of the displacement preventing groove 23m.

By pushing the clip 30 and then sliding the clip 30 in the longitudinal direction, positions of both by-pass holes 31a, 32a, which are formed on the pair of facing clipping pieces 31, 32, change and finally the notched groove 23i is shut by the pair of clipping pieces 31, 32. As a result, the free movement of the connecting pin 43 is restricted between the other facing plate 23c and the other clipping piece 32 of the clip 30.

Figure 5:
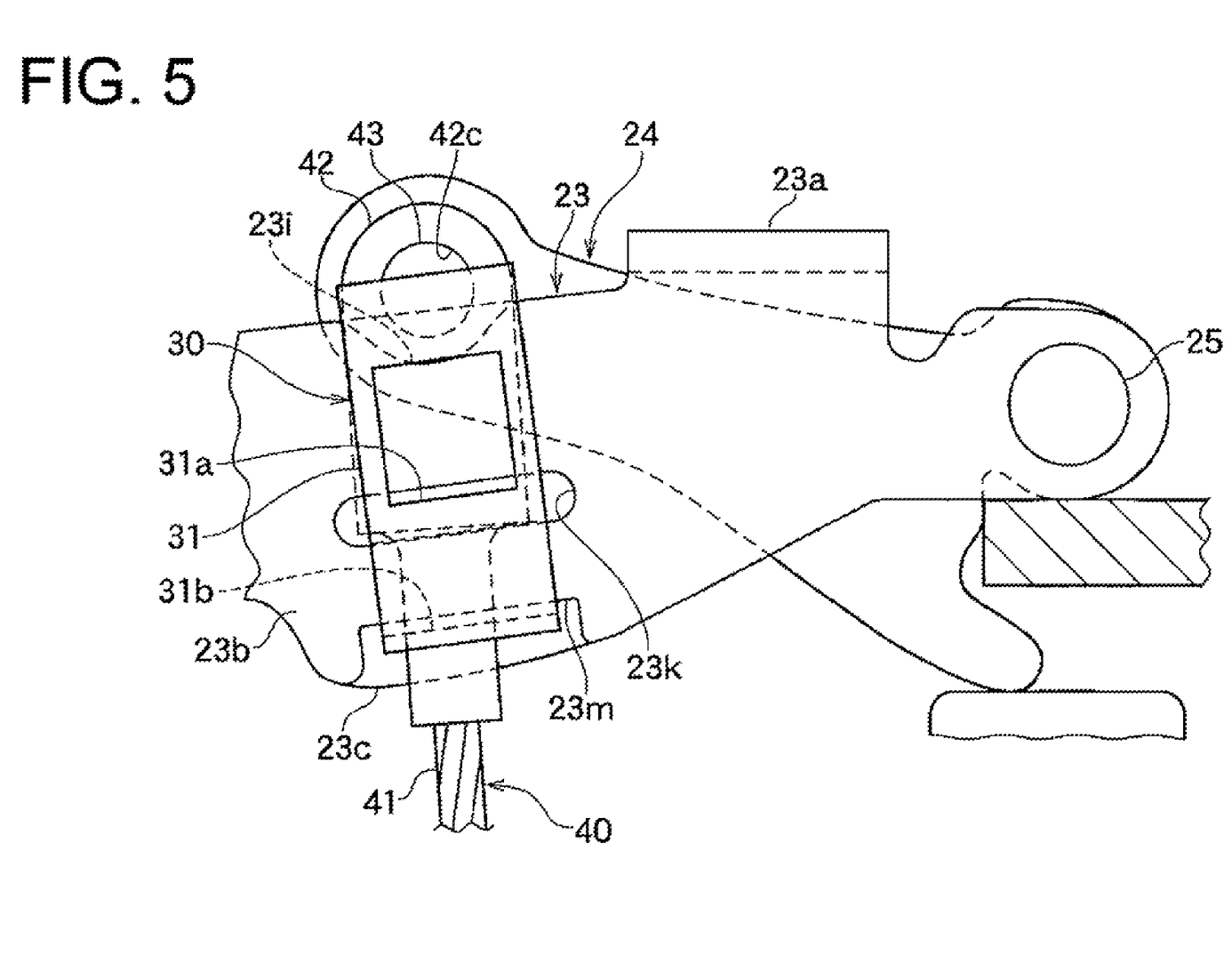
FIG. 5 is an enlarged view of the mechanical brake actuator structure and operation according to the first example, which illustrates the condition where the free end of the brake lever is exposed from the opening of the space of the strut in the cable releasing direction.

Finally, a casing cap 44a of the outer casing 44 is fixed at the other end of a guide pipe 45 with a ring 46, and an operation of connecting the cable end 42 to the brake lever 24 is completed. (See FIG. 2) Accordingly thereafter, if the brake lever 24 begins to rotate in the cable releasing direction, the brake lever 24 abuts against the bridge portion 23a of the strut 23, thereby restricting the further rotation thereof. (See FIG. 5). At this time, the free movement of the connecting pin 43 is restricted by the other facing plate 23c of the strut 23 and the other clipping piece 32 of the clip 30, thereby constantly positioning the connecting pin 43 in the wide space 23c of the strut 23, and the cable end 42 can not physically disconnect from the brake lever 24.

Also, when the cable end 42 needs to be disconnect from the brake lever 24, such as for exchanging the brake cable 40, after releasing the engagement between the hook 31b of the clip 30 and the disengagement preventing groove 23m formed on one facing plate 23b of the strut 23 by pinching the clipping piece 31, the clip 30 is pulled up as clipping on one facing plate 23b to be released from the notched groove 23i formed on one facing plate 23b of the strut 23, the connecting pin 43 can easily removed therefrom.

This example remarkably improves setting operability of the clip 30 by simple operation of setting the clip 30 on one facing plate 23b of the strut 23. Furthermore, the width of the clip 30 can be narrow because it is only required to set on one facing plate 23b of the pair of facing plates 23b and 23c therefore, compared with the conventional clip that needs to be set on the entire strut, the present invention is more economical in that the smaller clip 30 reduces the spring steel usage and the clip 30 can be formed by a simple bending process. The notched groove 23i formed on the strut 23 exists only on one facing plate 23b, and there is no need to have another notched groove on the other facing plate 23c, thereby limiting the degradation of the stiffness of the strut 23. Also, the clip 30 does not set on the bridge portion 23a of the strut 23, which maintains the stiffness of the bridge portion 23a. Furthermore, in this example, the free movement of the connecting pin 43 can be restricted by a combination of the notched groove 23i, formed on one facing plate 23b of the strut 23, and the clip 30, thereby not receiving any influence of the height of the bridge portion 23a to be formed on the strut 23. Accordingly, the height of the bridge portion can be lower, which can satisfy the strong demand of lowering the height of the brake device.

EXAMPLE 2

Figure 9:
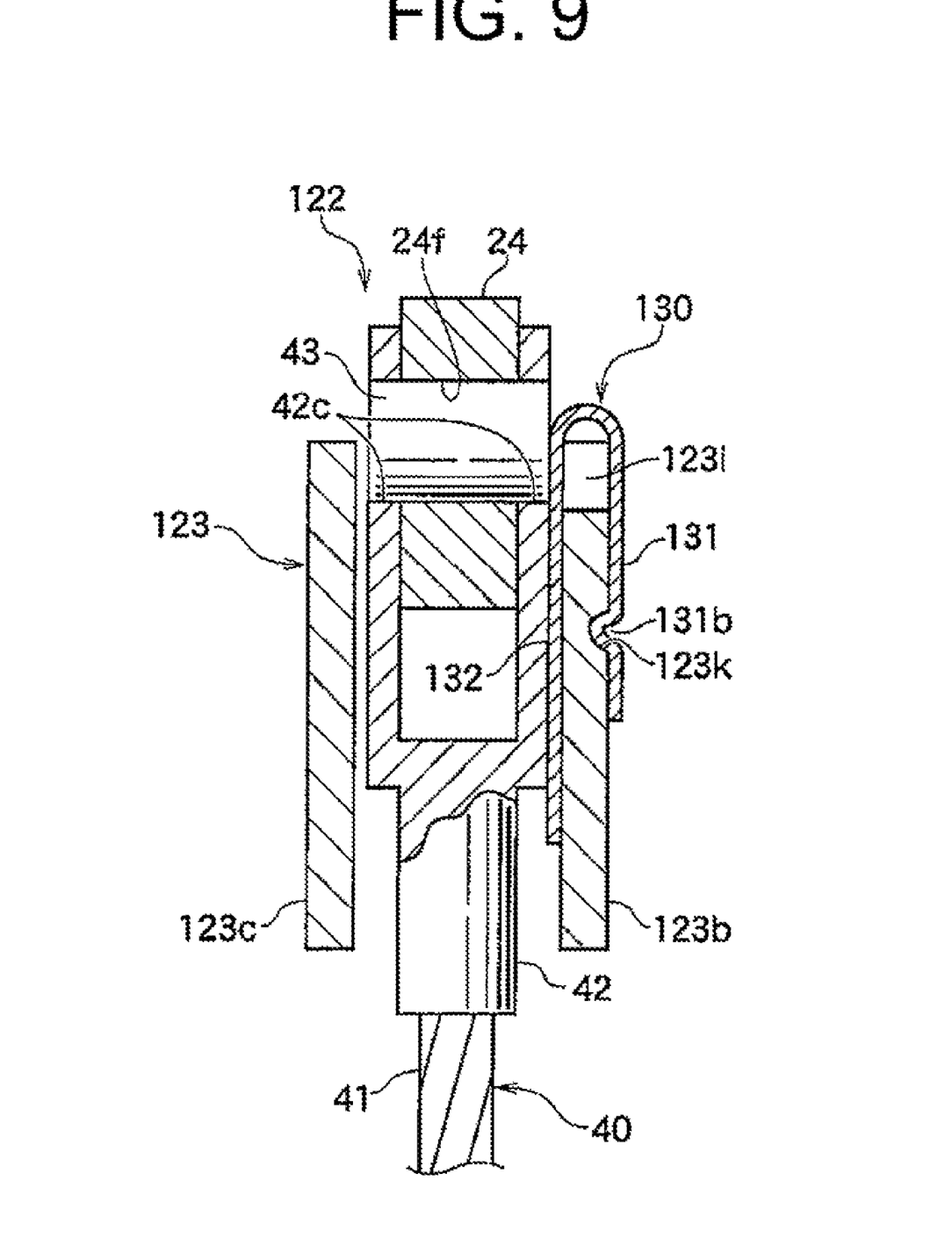
FIG. 9 is a cross section view of the mechanical actuating mechanism according to the second example, which illustrates the operation thereof and shows the condition of restricting the movement of the connecting pin by the clip, which is slideable in a vertical direction of the strut.

In the following section, the mechanical brake actuator relating to the second example will be explained with reference to FIG. 9. The clip 130 to be used in the second example has a simple structure wherein it is formed by bending one thin spring steel plate in a U-shape so as to resiliently clip one facing plate 123b of the strut 123, and without forming the by-pass hole on the pair of facing clipping pieces 131,132 as shown in the first example, an intermediate portion of one clipping piece 131 is bent to form the hook 131b, simply hooking the same on a positioning groove 123k formed on one facing plate 123b.

In this example, by inserting the connecting pin 43 in the connecting holes 42c, 24f, 42c through the notched groove 123i formed on one facing plate 123b while the brake lever 24 is abutting against the bridge portion (not shown in FIG. 9) of the strut 123, after completing the connection between the brake lever 24 and the cable end 42, the clip 130 with no hole later set on one facing plate 123b to shut the notched groove 123i. After setting the clip 130 without a hole, the free movement of the connecting pin 43 is restricted, as described in the first example, by the other facing plate 123c of the strut 123 and the other clipping piece 132 of the clip 130, and the cable end 42 does not physically disconnect from the brake lever 24.

In this example, in addition to the same advantages as described in the first example, there is a further advantage of eliminating a forming process for the by-pass hole when manufacturing the clip 130, which simplifies the manufacturing process for the strut 123. Furthermore, in this example, as described in the first example, the clip 130 is pushed to catch both side surfaces of one facing plate 123b of the strut 123 and to hold one facing plate 123b of the strut 123 by the resilient force of the clip 130, and the hook 131b formed on one clipping piece 131 of the clip 130 fits in the positioning groove 123k formed on an external side surface of one facing plate 123b, thereby simplifying and securing the positioning process for the clip 130 and preventing the disengagement of the clip 130 from the strut 123 even if the mechanical brake actuator is exposed to vibration or impact during car driving.

EXAMPLE 3

The mechanical brake actuator with regard to the third example will be explained with reference to FIG. 10. The clip 230 to be used in this example is formed by bending one thin spring steel plate in to a C-shape so as to be able to make a lateral slide while resiliently holding one facing plate 223b of the strut 223. The clip 230 of this example has no hole in one pair of clipping pieces 231 and 232 (the reference number 232 is omitted in the drawings) as same as the second example. One clipping piece 231 of the clip 230 has the external side surface of one facing plate 223b of the strut 223 and a fittable known convexo-concave section 233. Although the convexo-concave section 233 can be provided at one location, providing the convexo-concave section 233 at several locations gives more stable positioning of the clip 230.

Figure 10:
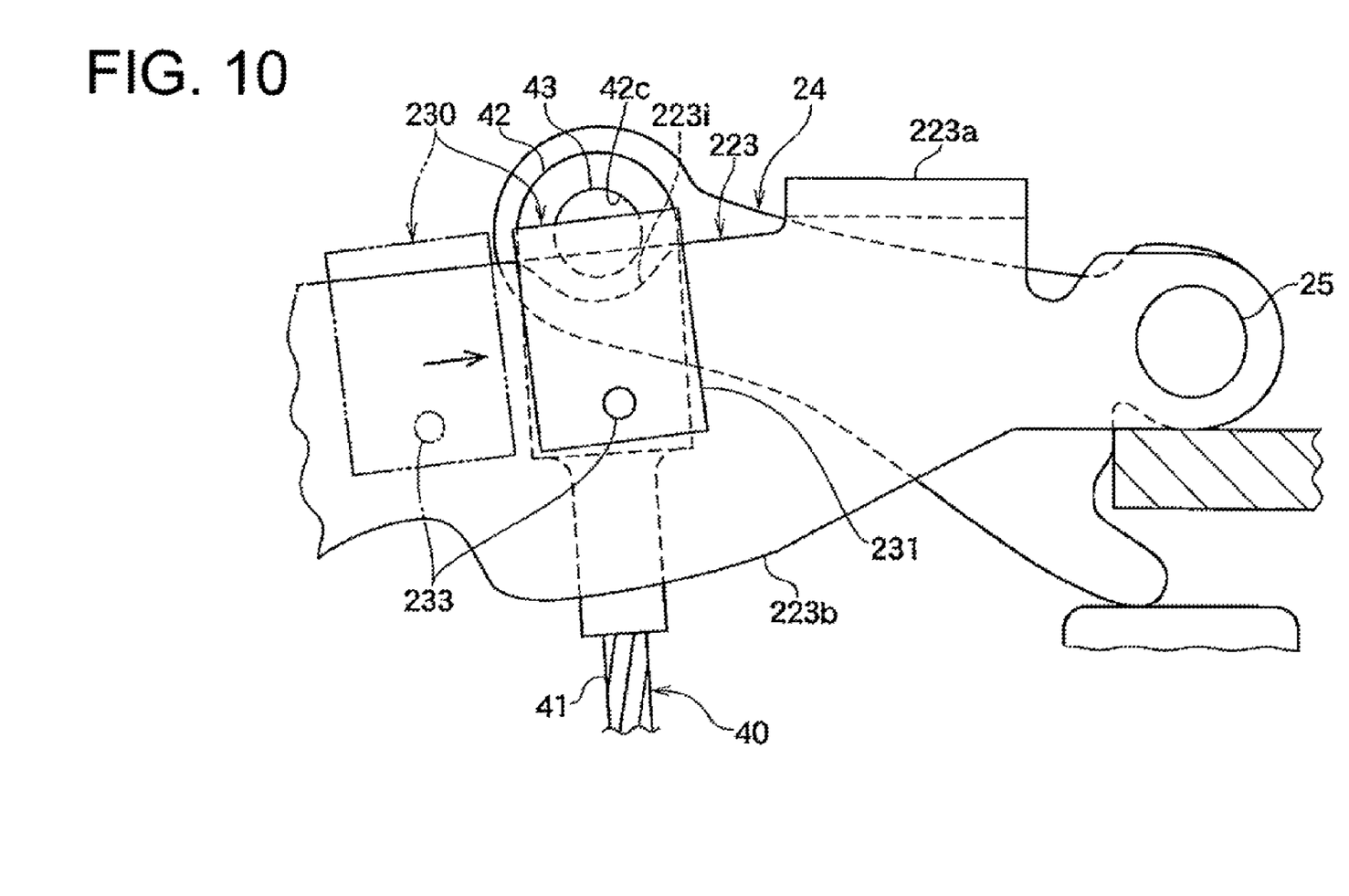
FIG. 10 is a cross section view of the mechanical actuating mechanism according to the third example, which illustrates the operation thereof and shows the condition of restricting the movement of the connecting pin by the clip, which is slideable in a lateral direction of the strut.

In this example, prior to connecting the cable end 42 to the brake lever 24, as shown in the chain double-dashed line in FIG. 10, the clip 230 is set on the strut 223 away from the notched groove 223i, which is formed on one clipping piece 223b of the strut 223, in a longitudinal direction of the brake lever 24 so as to release the notched groove 223i. By inserting the connecting pin 43 in the connecting holes 42c, 24f, 42c through the notched groove 223i formed on one facing plate 223b while the brake lever 24 is abutting against the bridge portion 223a of the strut 223, after completing the connection between the brake lever 24 and the cable end 42, the clip 230 is slid in a lateral direction of the strut 223 so as to shut the notched groove 223i. After sliding the clip 230, the free movement of the connecting pin 43 is restricted, as described in the first example, by the other facing plate of the strut 223 and the other clipping piece 232 of the clip 230, and the cable end 42 does not physically disconnect from the brake lever 24.

This example provides an advantage of simplifying the disengagement preventing operation of the connecting pin 43 by making a simple movement of the clip 230 along a side end of one facing plate 223b of the strut 223.

EXAMPLE 4

The mechanical brake actuator with regard to the fourth example will be explained with reference to FIG. 11. The clip 330 used in this example is formed by bending one thin spring steel plate in a C-shape so as to be rotatable while resiliently holding one facing plate 323b of the strut 323.

The clip 330 of this example has no hole in one pair of clipping pieces 331 and 332 (the reference number 332 is omitted in the drawings) as same as the second and third examples. One clipping piece 331 of the clip 330 has an inner and external side surfaced of one facing plate 323b of the strut 323 and a fittable known convexo-concave section 333, wherein the convexo-concave section 333 is a rotational center of the clip 330.

Figure 11:
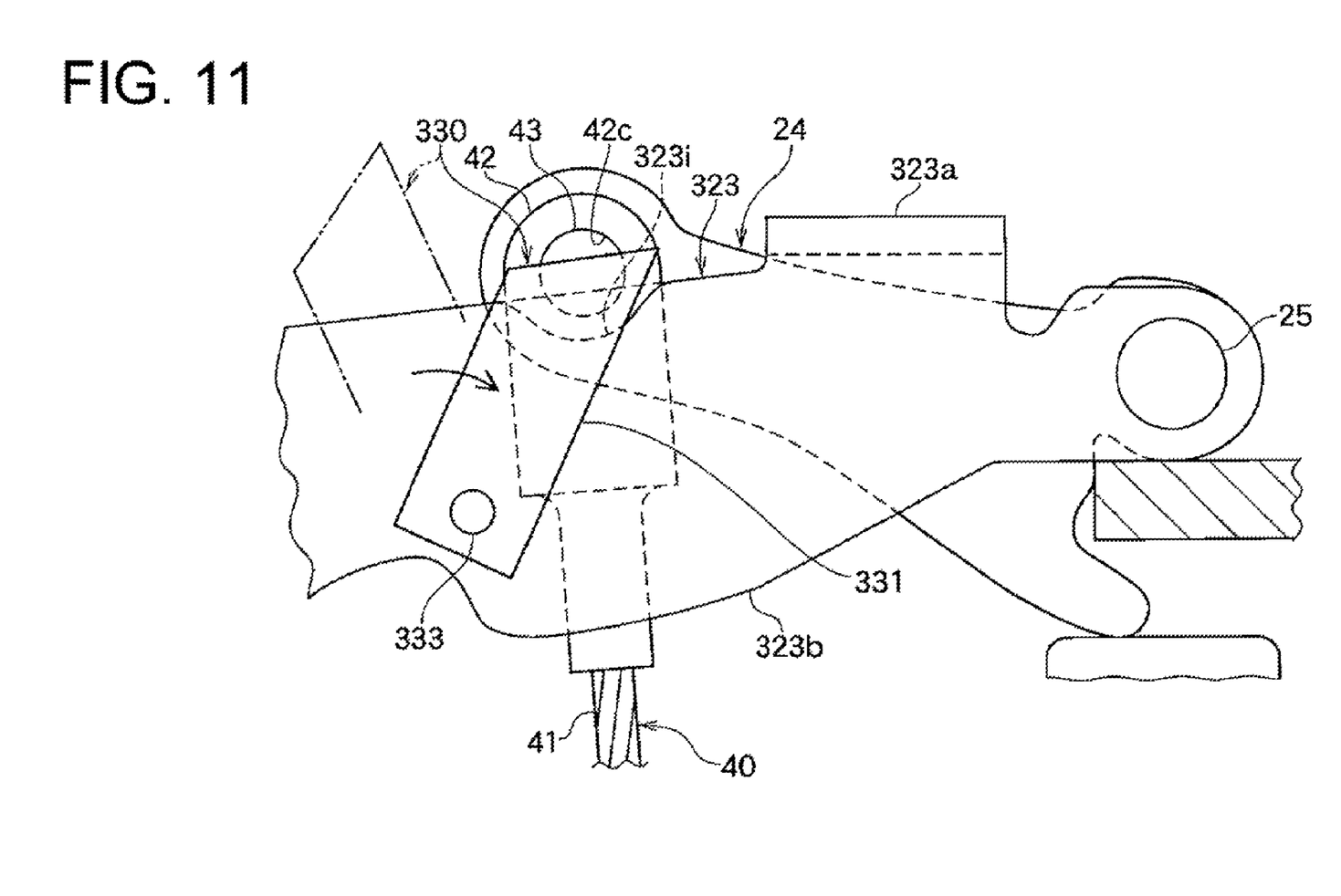
FIG. 11 is an explanatory view of the operation of the mechanical actuating mechanism according to the fourth example, which shows an enlarged view illustrating the condition where the rotating clip disables the brake lever rotation in the cable releasing direction.

In this example, prior to connecting the cable end 42 to the brake lever 24, as shown in the chain double-dashed line in FIG. 11, the clip 330 leans toward the left so as to release the notched groove 323i, which is formed on one clipping piece 331 of the strut 323. By inserting the connecting pin 43 in the connecting holes 42c, 24f, 42c through the notched groove 323i formed on one facing plate 323b while the brake lever 24 is abutting against the bridge portion 323a of the strut 323, after completing the connection between the brake lever 24 and the cable end 42, if the clip 330 rotates clockwise with the convexo-concave section 333 as the fulcrum, the pair of clipping pieces 331 and 332 of the clip 330 shuts the notched groove 323i.

After rotating the clip 330, the free movement of the connecting pin 43 is restricted, as described in the first-third examples, by the other facing plate 323c of the strut 323 and the other clipping piece 332 of the clip 330, and the cable end 42 does not physically disconnect from the brake lever 24.

In this example, the clip 330 is simply rotated, thereby providing an advantage of further simplification in disengagement prevention of the connecting pin 43.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

I claim:
1. A mechanical brake actuator comprising:
   (a) a strut to engage with one brake shoe, said strut including first and second facing plates and a bridge portion connecting said facing plates; and
   (b) a plate-like brake lever to engage with the other brake shoe and to be retained in a space between said facing plates of said strut, said brake lever including a proximal end pivotally supported at said strut, said brake lever and strut relatively rotate to spread apart from each other as pulling a brake cable connected to a free end of said brake lever via a connecting pin, wherein
   said first facing plate is designed so as to permit a longitudinal movement of said connecting pin to connect said brake cable and the free end of said brake lever while the brake lever rotates in a cable releasing direction to a limit, and said second facing plate is designed so as to restrict the longitudinal movement of said connecting pin while said brake lever rotates in said cable releasing direction to said limit, and
   a clip is set on said first facing plate so as to restrict the longitudinal movement of said connecting pin which connects said brake cable and the brake lever.
2. The mechanical brake actuator according to claim 1, wherein
   a notched groove is formed on said first facing plate to permit said longitudinal movement of said connecting pin therethrough while said brake lever rotates in said cable releasing direction to said limit.
3. The mechanical brake actuator according to claim 1, wherein
   a means to restrict a lateral movement of said clip is provided on said first facing plate.
4. The mechanical brake actuator according to claim 1, wherein
   said clip is temporarily set on said first facing plate so as not to separate each other.
5. The mechanical brake actuator according to claim 1, wherein
   said clip is slidably set on said first facing plate.
6. The mechanical brake actuator according to claim 1, wherein
   said clip is rotatably set on said first facing plate.

* * * * *